Sept. 8, 1964      N. J. DANIELS      3,147,999
DUMP BED FOR PICKUP TRUCKS
Filed Feb. 5, 1963      2 Sheets-Sheet 1
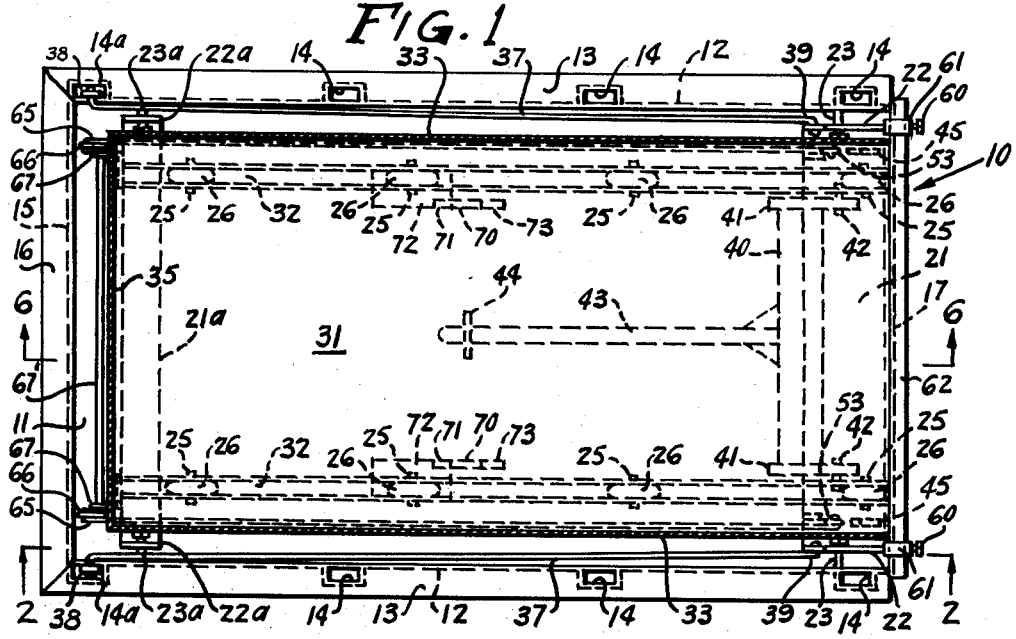
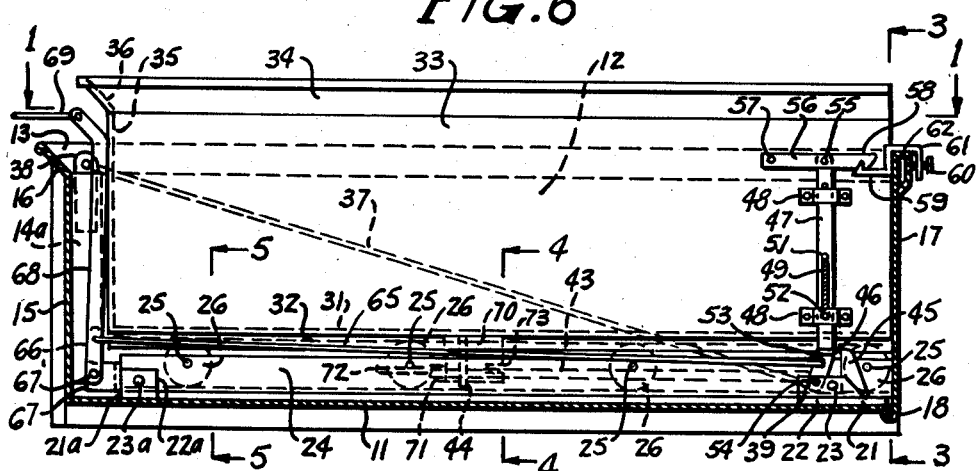
INVENTOR.
NEALE J. DANIELS
BY Kimmel & Crowell
ATTORNEYS.

Sept. 8, 1964   N. J. DANIELS   3,147,999
DUMP BED FOR PICKUP TRUCKS
Filed Feb. 5, 1963   2 Sheets-Sheet 2

INVENTOR.
NEALE J. DANIELS
BY
Kimmel & Crowell
ATTORNEYS.

United States Patent Office 3,147,999
Patented Sept. 8, 1964

3,147,999
DUMP BED FOR PICKUP TRUCKS
Neale J. Daniels, 9310 Linden Ave., Bloomington, Calif.
Filed Feb. 5, 1963, Ser. No. 256,362
6 Claims. (Cl. 298—15)

This invention relates to a dump bed for pickup trucks, flat bottom trucks, or the like, and has as its primary object the provision of an improved dump body construction which can be readily installed on a conventional pickup truck or the like to convert the same into a dump truck.

An additional object of the invention is the provision of such a device which includes a roller frame and a dump body linearly movable thereon within the confines of the conventional truck body, together with guide means in an over center arrangement whereby the body or auxiliary dump attachment may move rearwardly on the rollers of the frame relative to the truck body, and dump to provide adequate dump truck conversion means.

An additional object of the invention is the provision of such a device which may be readily actuated from the cab of the truck, with a minimum of effort and difficulty.

A further object of the invention is the provision of such a conversion unit which is sturdy and durable in construction, reliable and efficient in operation, simple and inexpensive to manufacture and install and easy to operate.

Still other objects reside in the combinations of elements, arrangements of parts, and features of construction, all as will be more fully pointed out hereinafter and disclosed in the accompanying drawings wherein there is shown a preferred embodiment of this inventive concept.

In the drawing:

FIGURE 1 is a top plan view of one form of dump bed for pickup trucks or the like constructed in accordance with the instant invention, and shown as applied to the conventional body of a pickup truck, the chassis and cab of the latter being omitted, and certain parts being shown in dotted lines, the latter being concealed in the top plan view.

FIGURE 2 is a side view, partially in elevation, showing the conventional pickup truck body in section, taken substantially along the line 2—2 of FIGURE 1 as viewed in the direction indicated by the arrows.

FIGURE 6 is a sectional view taken substantially along the line 6—6 of FIGURE 1 as viewed in the direction indicated by the arrows.

Similar reference characters refer to similar parts throughout the several views of the drawing.

Figure 3:
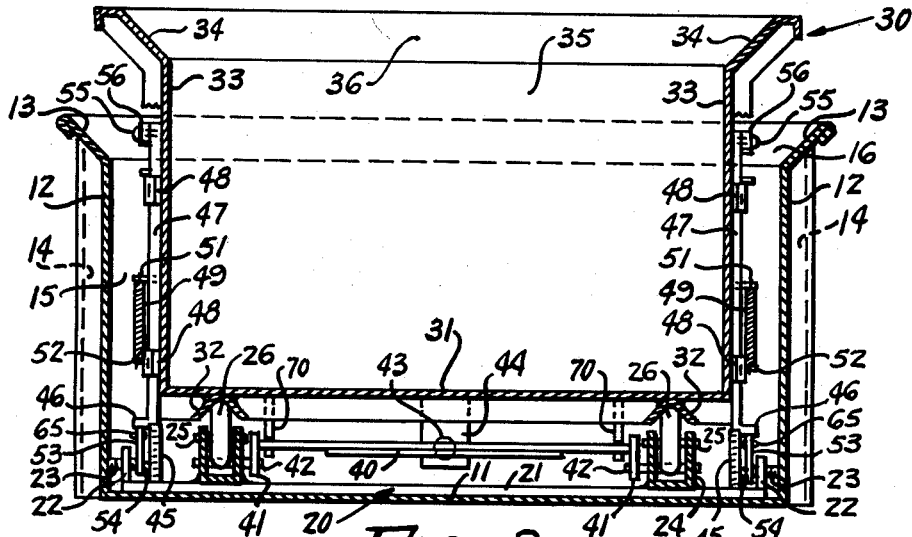
FIGURE 3 is an enlarged sectional view taken substantially along the line 3—3 of FIGURE 2 as viewed in the direction indicated by the arrows.
Figure 4:
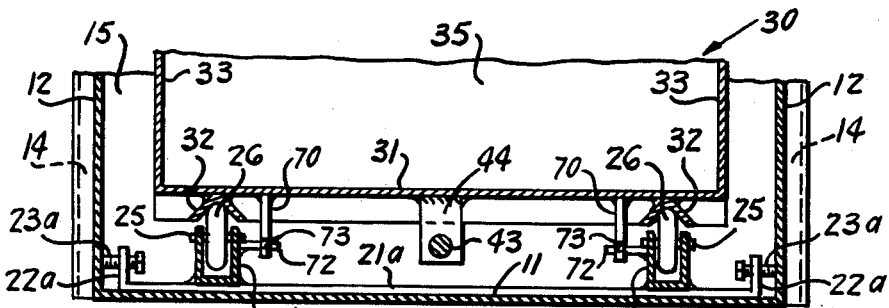
FIGURE 4 is an enlarged fragmentary sectional view taken substantially along the line 4—4 of FIGURE 2 as viewed in the direction indicated by the arrows.
Figure 5:
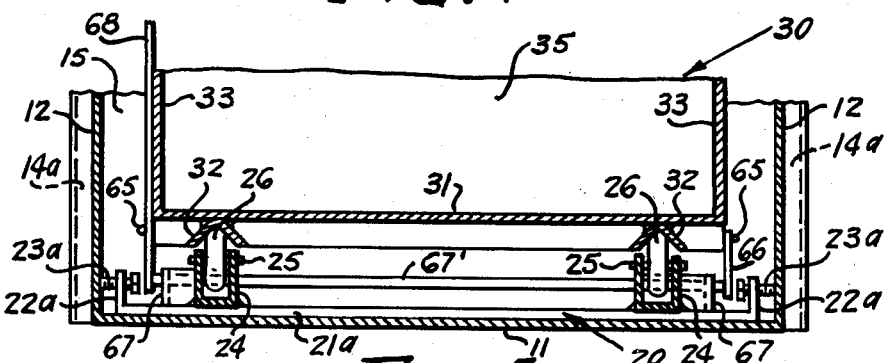
FIGURE 5 is an enlarged sectional view taken substantially along the line 5—5 of FIGURE 2 as viewed in the direction indicated by the arrows.

Having reference now to the drawings in detail, there is generally indicated at 10 the body of a conventional pickup truck or the like which is adapted to be mounted on a truck frame of conventional type, the latter not being shown. The body 10 comprises a floor 11 and side walls 12 outwardly flared at their tops as at 13, and provided with conventional stake pockets 14 along their sides at suitable spaced intervals. A front wall 15 is also provided adjacent the cab of a truck and flared outwardly as at 16. The rear end of the pickup truck body is closed by a conventional end gate 17, preferably hinged at its bottom as on a hinge pin 18 to the bottom 11.

The instant invention contemplates the insertion in the pickup truck body of a base or roller frame generally indicated at 20 which includes a transverse rear plate 21 having upwardly projecting side flanges 22 through which project rear holding screws 23 which, when engaged with the side walls 12, serve to hold the frame in position. A substantially identical front frame member 21a is provided with substantially identical side flanges 22a and clamping bolts 23a adjacent the forward end of the frame. The end frame members are connected by side plates 27 which support U-shaped channel members 24, across which, at suitably spaced intervals extend axles 25 which carry rollers 26. Channels 24 extend the full length of the frame and serve as tracks for a dump body generally indicated at 30 which includes a bottom 31 having inverted V-shaped tracks 32 extending substantially the full length thereof, the tracks 32 being supported on and longitudinally movable over the rollers 26. Dump body 30 also includes side walls 33 which are flared outwardly at their tops as at 34, and a front wall 35 also outwardly flared as at 36 in conformity to conventional practice.

Anchor rods extend from anchor pins 38 which are inserted in front stake loops 14a to suitable openings in rear flanges 22, as indicated at 39 and serve the secure the base or roller frame 20 firmly in position in the pickup truck body.

A latch bar 40 extends transversely across the rear of the underside 31 of the dump bed and is secured between side flanges 41, which in turn are pivoted as by pivots 42 to the rear ends of channels 24, as best shown in FIGURE 3. A guide rod 43 extends along the underside 31 of the dump bed and engages in a guide bracket 44 carried dependingly from the bottom or underside 31, serving, when the body is dumped in a manner hereinafter to be described, to maintain the tracks 32 in aligned relation with their associated rollers 26. A slot 73 (to be further described hereinafter) is likewise maintained in aligned relationship with a latch bar 40.

Detents or lock members 45 project upwardly from end frame plate 21, and are normally engaged by the lower L-shaped ends 46 of latch members 47 which are mounted for vertical slidable movement in mounting brackets 48 on opposite sides of the rear portion of side walls 33. Springs 49 engaged at one end by pins 51 carried by latch members 47 and at their other end by pins 52 carried by the lower brackets 48, serve normally to bias the ends 46 into engagement with the detents or latch members 45 and preclude rearward or dumping movement of the dump body 30.

Latch ends 46 overlie cam surface members 53 which are pivoted as at 54 to the lower portions of stops or detents 45, and when lifted in a manner to be hereinafter described, serve to move the ends 46 of latches 47 out of engagement with detents 45 so that the bed 30 may move rearwardly on rollers 26.

The upper ends of latch members 47 are pivoted as at 55 to latch members 56 which are in turn pivoted as at 57 to the outer side walls 33 of the dump bed. The opposite or rear ends 58 of latch members 56 engage fixed detents 59 which are clamped as by means of clamping bolts 60 extending through a bracket 61 to the top 62 of tail gate 17. The arrangement is thus such that upward movement of the latch members simultaneously releases tail gate 17 for movement about its hinge pin 18, and releases dump bed or body 30 for rearward movement on rollers 26. Movement of the latches or cam members 46 is effected by a pair of operating rods 65 which extend along opposite sides of the frame 20 to the front end thereof, each rod 65 being secured to a leg 66 which is pivoted at one end to a plate 67 integral with frame 20, the opposite links being connected by a tie rod 67 so that they will move in unison simultaneously to release a latch end 46. A dump lever 68 is in turn fixedly connected to the tie rod 57 and extends upwardly to a point above the rear wall flange 16, and is connected by means of a cable or cord 69 to the cab of the truck.

The underside of dump bed 30 is provided with a pair of latch members 70 on opposite sides thereof, each latch member having a forwardly projecting portion 71 which, when the bed is in its lower position, as shown in the drawings, engage inwardly projecting plate 72 secured to channels 24 to hold the bed down. On their opposite sides each latch member is provided with a slot 73, which when the body is tilted to dumping position, serves to engage latch bar 40, to prevent dump bed 30 from sliding completely out of the pickup truck body.

From the foregoing the use and operation of the device should now be readily understandable. When it is desired to install the dump bed of the instant invention in a pickup truck, the frame or base 20 is first positioned in the body on the floor 11 thereof, and clampingly engaged in position by tightening the bolts or locking screws 23 and 23a. Simultaneonsly, the anchor rods 37 are connected between the stake looped anchor pins 38 and the openings 39 so that the frame is securely held in position. The dump body or bed 30 is then positioned so that the tracks 32 are freely movable linearly on the rollers 26.

When it is desired to dump the truck, actuation of dump lever 68 releases latches 46 from detents 45 and at the same time disengages latch members 58 and 59 so that the tail gate 17 may fall rearwardly by gravity about its hinge pin 18. The truck is then backed slowly, and braked, at which time momentum causes the dump bed 30 to roll rearwardly along the rollers 26 until such time as the slots 73 in latch plate 70 engage rear latch bar 40. At this time the body is overbalanced, and dumps rearwardly about the pivot provided by pivot pins 42, which, being fixed to the roller frame, are immovable, while the guide bar 43 maintains the dump bed in alignment with the roller channels 24 and the associated tracks 32. After the dumping is completed, the body may be moved manually back into position in the pickup truck body, the tail gate closed and relatched and the device is again ready for use.

From the foregoing it will now be seen that there is herein provided an improved dump bed for pickup trucks or the like which accomplishes all the objects of this invention, and others, including many advantages of great practical utility and commercial importance.

As many embodiments may be made of this inventive concept, and as many modifications may be made in the embodiment hereinbefore shown and described, it is to be understood that all matter herein is to be interpreted merely as illustrative, and not in a limiting sense.

I claim:

1. A dump bed for pickup trucks comprising a base, means adapted for securing said base to a pickup truck body, channels extending longitudinally of said base, rollers in said channels, a dump body, tracks on the underside of said dump body movable on said rollers, a latch plate pivoted to said base, a guide rod secured to said latch plate, a guide plate on the underside of said body, engaged by said guide rod, latch means normally holding said dump body against linear movement relative to said base, remotely operable means for releasing said latch means, and stop means on the underside of said dump body engageable with said latch plate on tilting of said body.

2. The structure of claim 1 wherein additional latch means are operable by said remotely operable means adapted to release the tail gate of a pickup truck.

3. The structure of claim 2 wherein said latch means and said additional latch means are duplicated on each side of said dump body, and said remotely operable means comprises a dump lever common to all said latch means.

4. The structure of claim 3 wherein flanges are provided interiorly of said channels, and said stop means are provided with projections engaging said flanges for holding said dump body down when in retracted position.

5. The structure of claim 4 wherein said latch means comprise detents fixed to said base, vertically movable latch members engageable with said detents, and cam means operable by said dump lever to raise said vertically movable latch members.

6. The structure of claim 1 wherein said means adapted for securing said base to a pickup truck body comprise vertical flanges on the sides of said base, and clamping bolts extended through threaded openings in said flanges adapted to engage the side walls of a pickup truck body.

References Cited in the file of this patent

UNITED STATES PATENTS

| | | |
|---|---|---|
| 1,633,364 | Carvalho | June 21, 1927 |
| 2,529,558 | Klingebiel | Nov. 14, 1950 |
| 3,055,709 | Kirkwood | Sept. 25, 1962 |